US011694183B2

(12) United States Patent
Shah et al.

(10) Patent No.: US 11,694,183 B2
(45) Date of Patent: Jul. 4, 2023

(54) ARTIFICIAL INTELLIGENCE-BASED SYSTEM AND METHOD FOR CONDITIONAL ELECTRONIC TRANSACTION PROCESSING

(71) Applicant: Capital One Services, LLC, McLean, VA (US)

(72) Inventors: Salik Shah, Washington, DC (US); Sophie Bermudez, Washington, DC (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 365 days.

(21) Appl. No.: 16/847,882

(22) Filed: Apr. 14, 2020

(65) Prior Publication Data
US 2021/0319424 A1    Oct. 14, 2021

(51) Int. Cl.
*G06Q 20/00* (2012.01)
*G06Q 20/32* (2012.01)
*G06Q 20/40* (2012.01)
*G06F 40/30* (2020.01)
*G06N 20/00* (2019.01)

(52) U.S. Cl.
CPC ........... *G06Q 20/325* (2013.01); *G06F 40/30* (2020.01); *G06N 20/00* (2019.01); *G06Q 20/405* (2013.01)

(58) Field of Classification Search
CPC ............................. G06Q 20/325; G06Q 20/405
See application file for complete search history.

(56) References Cited

U.S. PATENT DOCUMENTS

| 9,317,882 | B2 | 4/2016 | Bosko et al. |
| 9,377,790 | B2 | 6/2016 | Gordon et al. |
| 9,749,714 | B2 | 8/2017 | Umetani et al. |
| 2007/0260402 | A1 | 11/2007 | Taras et al. |
| 2012/0084164 | A1* | 4/2012 | Hammad ............. G06Q 20/405 705/21 |
| 2013/0145324 | A1 | 6/2013 | Kelly et al. |

(Continued)

OTHER PUBLICATIONS

Community Food Bank of New Jersey Receives Donation of Ultra-Large Capacity Refrigerator Stock with 47 Gallons of Milk from LG Electronics: Donation to Provide Additional Storage Space for 2011 Perishable Food Donations and Help Nourish the States Growing Hungry Population, PR Newswire, Feb. 3, 2011 (Year: 2011).*

*Primary Examiner* — Matthew L Hamilton
(74) *Attorney, Agent, or Firm* — Hunton Andrews Kurth LLP

(57) ABSTRACT

Systems and methods for artificial intelligence (AI)-based systems and methods for conditional electronic processing are provided. An example method includes receiving real time data from one or more data sources associated with one or more connected smart devices; continuously evaluating the real time data to determine whether the one or more transaction conditions is met; upon determining that the one or more transaction conditions has been met, utilizing prioritized parameters to determine to which users an alert of a transaction request is broadcast; broadcasting the alert of the transaction request via a user application; transmitting, via a push notification gateway, a push notification to the user application on a user device; and establishing, via a network, a secure connection between the user device and an AI engine for executing the transaction request.

18 Claims, 5 Drawing Sheets

(56) References Cited

U.S. PATENT DOCUMENTS

| | | |
|---|---|---|
| 2013/0297785 A1 | 11/2013 | Son et al. |
| 2014/0122263 A1 | 5/2014 | Padgett et al. |
| 2014/0250019 A1 | 9/2014 | Causey et al. |
| 2014/0302795 A1 | 10/2014 | Chacon et al. |
| 2015/0075373 A1* | 3/2015 | Miller ............... B01D 46/0032 96/400 |
| 2015/0081327 A1 | 3/2015 | Mooker |
| 2015/0099245 A1 | 4/2015 | Bouchard et al. |
| 2015/0332007 A1 | 11/2015 | Rosebraugh |
| 2016/0042368 A1* | 2/2016 | Sloss ....................... G06Q 20/14 705/7.31 |
| 2016/0054020 A1 | 2/2016 | Deivasigamani et al. |
| 2016/0147200 A1 | 5/2016 | Zhang et al. |
| 2016/0171479 A1* | 6/2016 | Prakash .................. H04W 4/70 726/1 |
| 2016/0225097 A1 | 8/2016 | Cooper et al. |
| 2016/0363944 A1 | 12/2016 | Kim et al. |
| 2017/0084152 A1 | 3/2017 | Wolfram |
| 2017/0103677 A1 | 4/2017 | Bhattacharjee et al. |
| 2017/0110025 A1 | 4/2017 | Abbasi Talaei et al. |
| 2017/0123440 A1 | 5/2017 | Mangsuli et al. |
| 2017/0220959 A1 | 8/2017 | Regan et al. |
| 2017/0242412 A1 | 8/2017 | Kim |
| 2018/0024541 A1 | 1/2018 | Zhu |
| 2018/0033003 A1* | 2/2018 | Koganti ........... G06Q 20/38215 |
| 2018/0047047 A1 | 2/2018 | Joyson et al. |
| 2018/0047106 A1 | 2/2018 | Snyder et al. |
| 2018/0202870 A1* | 7/2018 | Esposito ................ G01K 1/024 |
| 2019/0075664 A1* | 3/2019 | Sisson .................. H05K 5/0204 |
| 2020/0111096 A1* | 4/2020 | Liu ........................ H04L 67/55 |
| 2021/0166279 A1* | 6/2021 | Louw ................. G06Q 30/0279 |
| 2021/0174402 A1* | 6/2021 | Barakat .............. G06Q 20/4014 |

\* cited by examiner

ARTIFICIAL INTELLIGENCE-BASED SYSTEM AND METHOD FOR CONDITIONAL ELECTRONIC TRANSACTION PROCESSING

FIELD OF THE INVENTION

The present disclosure relates to artificial intelligence (AI) technology, and more particularly, to AI-based systems and methods for conditional electronic transaction processing that utilizes a unique integration of systems to facilitate the execution of a transaction at an optimal instance when a condition has been satisfied.

BACKGROUND

Currently, electronic transaction systems require users to either make instant transactions, or schedule transactions based on a predefined date and time. Additionally, electronic transaction processing requires the manual monitoring of various data sources, including the manual selection of the data sources and manual selection of the time and frequency of the associated manual monitoring, which is time and resource intensive on the associated systems.

Furthermore, in the context of electronic financial transactions, upon initiation of a financial transaction by a customer, for example by swiping a credit card at a point of service terminal to make a purchase, a financial institution system has less than 100 milliseconds to approve the transaction. This almost instant approval time requirement does not allow for the implementation of multi-factor electronic conditional transaction processing.

These and other drawbacks exist. Therefore, what is needed are systems and methods for multi-factor conditional electronic transaction processing that facilitate the automatic execution of a transaction at an optimal instance when a condition has been satisfied.

SUMMARY

Embodiments of the present disclosure provide AI-based system for conditional electronic transaction processing. The system comprises a data storage containing user identification information and one or more transaction conditions; an AI engine coupled to an application programming interface (API) that enables transmission of real time data. The AI engine is configured to: receive the real time data from one or more data sources associated with one or more connected smart devices; continuously evaluate the real time data to determine whether the one or more transaction conditions is met; upon determining that the one or more transaction conditions has been met, utilize prioritized parameters to determine to which users an alert of a transaction request is broadcast; and broadcast the alert of the transaction request via a user application; an application server being associated with the user application. The system further comprises a communication interface coupled to the application server and configured to transmit, via a push notification gateway, a push notification to the user application on a user device that establishes, via a network, a secure connection between the user device and the AI engine to execute the transaction request.

Embodiments of the present disclosure provide a method for conditional electronic transaction processing. The method comprises receiving real time data from one or more data sources associated with one or more connected smart devices; continuously evaluating the real time data to determine whether the one or more transaction conditions is met; upon determining that the one or more transaction conditions has been met, utilizing prioritized parameters to determine to which users an alert of a transaction request is broadcast; broadcasting the alert of the transaction request via a user application; transmitting, via a push notification gateway, a push notification to the user application on a user device; and establishing, via a network, a secure connection between the user device and an AI engine for executing the transaction request.

Embodiments of the present disclosure provides an AI-based system for conditional electronic transaction processing. The system comprises an AI engine coupled to an application programming interface (API) that enables transmission of real time data. The AI engine is configured to: receive real time data from one or more data sources associated with one or more connected smart devices; continuously evaluate the real time data to determine whether the one or more transaction conditions is met; upon determining that the one or more transaction conditions has been met, utilize prioritized parameters to determine to which users an alert of a transaction request is broadcast; and broadcasts the alert of the transaction request via a user application. The system further comprises a recommendation engine that utilizes machine learning and natural language processing to process and cluster the received real time data to generate recommendations of transaction conditions that are evaluated to determine whether the alert of the transaction request should be transmitted; an application server being associated with the user application; and a communication interface associated with the application server, that transmits, via a push notification gateway, a push notification to the user application on a user device that establishes, via a network, a secure connection between the user device, the AI engine and the recommendation engine to execute the transaction request.

Further features of the disclosed methods and systems, and the advantages offered thereby, are explained in greater detail hereinafter with reference to specific example embodiments illustrated in the accompanying drawings.

DETAILED DESCRIPTION OF THE EMBODIMENTS

Figure 1:
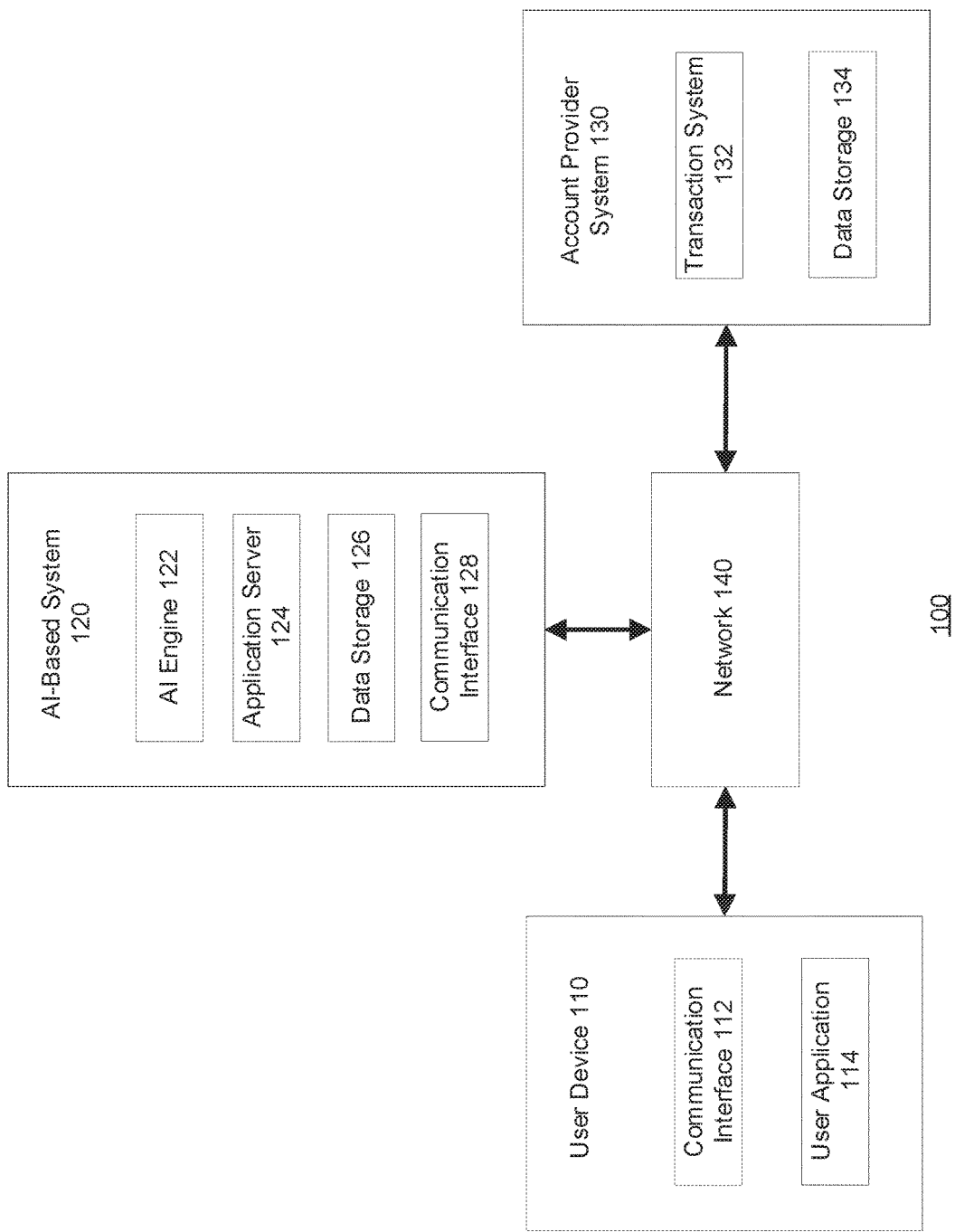
FIG. 1 depicts an example integrated system for conditional electronic transaction processing, according to embodiments of the present disclosure.

The following description is intended to convey a thorough understanding of the embodiments described by providing a number of specific example embodiments and details involving AI-based systems and methods for conditional electronic transaction processing. It should be appreciated, however, that the present disclosure is not limited to these specific embodiments and details, which are examples only. It is further understood that one ordinary skill in the art, in light of known systems and methods, would appreciate the use of the invention for its intended purposes and benefits in any number of alternative embodiments, depending on specific design and other needs. A financial institution and system supporting a financial institution are used as examples for the present disclosure. The present disclosure is not intended to be limited to financial transaction processing only. For example, the AI-based system may be utilized to facilitate other electronic transactions, including transferring rewards points, booking travel and restaurant reservations, sending electronic communications to connected user devices, and the like.

The present disclosure is not to be limited in terms of the particular embodiments described herein, which are intended as illustrations of various aspects. Many modifications and variations can be made without departing from its spirit and scope, as may be apparent. Functionally equivalent methods and apparatuses within the scope of the present disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

The below description, along with its associated embodiments, has been presented for purposes of illustration only. It is not exhaustive and does not limit the invention to the precise form disclosed. Those skilled in the art may appreciate from the below description that modifications and variations are possible in light of the below teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

In the present disclosure, various preferred embodiments have been described with references to the accompanying drawings. It may, however, be evident that various modifications and changes may be made thereto, and additional embodiments may be implemented, without departing from the broader scope of the invention as set forth in the claims that follow. The present disclosure and drawings are accordingly to be regarded as an illustrative rather than restrictive sense.

Various embodiments of the present disclosure provide AI-based systems and methods for conditional electronic transaction processing that utilize enhanced AI technologies to facilitate and also automatically recommend smart transaction conditions for optimized and multi-factor electronic conditional transaction processing. An AI-based system may be fully integrated with an account provider system and other third party systems. This unique integration facilitates the real time aggregation and evaluation of data from disparate sources including connected user devices and public data sources to automatically execute a conditional transaction.

An AI-based system for conditional electronic transaction processing may include an AI engine, an application server, a data storage, and a communication interface. The AI engine may be coupled to an application programming interface (API) that enables the transmission of real time data. The AI engine may receive real time data from one or more data sources associated with one or more smart transaction conditions. For example, the AI engine may receive real time data from connected devices, including user devices, sensors (e.g., sensors on user devices), and/or public data systems. The received real time data may include voice data, geolocation data, and/or image data.

The AI engine may aggregate the received real time data by parsing and processing the received real time data across the one or more data sources, and may utilize AI technologies to parse and process input data to extract conditionally relevant meaning from the input data. Specifically, the AI engine may utilize AI technologies such as facial recognition, voice recognition and/or natural language processing to translate the received input data into a form that may be utilized by the AI engine to evaluate whether one or more of the smart conditions has been met. For example, the AI engine may receive audio data from a connected user's device, and may utilize voice recognition and natural language processing technologies to process the input audio data to extract conditionally relevant meaning from the input audio data.

The AI engine may continuously evaluate the aggregated data to determine whether the one or more smart transaction conditions is met. The AI engine may utilize prioritized parameters to evaluate the received real time data to generate a score that is utilized by the AI-based system to determine whether a transaction should be executed.

The determination that the one or more smart transaction conditions has been met, may trigger the AI engine to call, an API coupled to the communication interface that communicates with an account provider system, to automatically facilitate the conditional transaction, which may include a payment. The communication interface associated with the application server may transmit, via a push notification gateway, a push notification to a user application on a user device that establishes, via a network, a secure connection between the user device and the AI engine. The application server may transmit via the communication interface, a push notification to the user device, via the user application, including data indicative of the executed conditional transaction.

The AI engine may utilize machine learning and natural language processing to process and cluster the aggregated data to generate recommendations of the one or more smart transaction conditions that may be evaluated to determine whether a transaction should be executed. These system generated recommended smart transaction conditions may be stored in the data storage. Additionally, the application server may transmit, via the communication interface, a push notification to a user device, via a user application, which includes the generated recommended smart transaction conditions.

The AI-based system may also facilitate multi-factor electronic conditional transaction processing. An initial smart condition may be configured such that upon occurrence of the initial smart condition, a subsequent condition must then be met for the transaction to be executed. The AI engine may continuously evaluate the aggregated data to determine whether the subsequent condition is met. For example, upon determining that the one or more smart transaction conditions has been met, the AI engine may request and receive geolocation data for a user device associated with the conditional transaction, and may utilize the received geolocation data to determine whether the user device is at a particular location specified in the smart transaction condition, and upon detecting the user device is at the particular location, may automatically execute the associated conditional transaction. The AI-based system may also include an authentication processor that may be connected to the AI engine. The authentication processor may be configured to confirm a location of a user device associated with the conditional transaction over a wireless connection by evaluating a unique user identification—secure link token pair.

In an example embodiment, an AI-based system may allow a first user to approve a financial transaction utilizing AI technologies and conditional transaction processing at the instant the financial transaction is initiated, for example, upon receiving a notification that a connected second user has initiated a financial transaction, and at the time the financial transaction is initiated. The first user may configure the associated smart condition such that the first user is required to manually approve the second user's transaction by sending a response confirming authorization via the first user's user device, upon which a request to a connected transaction system to automatically execute the associated financial transaction is transmitted.

In another embodiment, where an additional condition must be satisfied to trigger execution of a financial transaction, a first user may set up a condition that if a connected second user initiates a transaction at a particular time of day, a request will be transmitted to approve the financial transaction. For example, an afternoon time of Saturday may be specified, such that the first user can have free time to check and confirm the transaction prior to the automatic execution of the transaction by the account provider system. An additional condition may be defined, tied to the geolocation of a user device associated with the second user, such that the financial transaction will only be executed if the second user is actually at a defined location. For example, when the second user is an elderly user and the user device associated with the second user is a smart refrigerator in the second user's kitchen, the geolocation of the user device can be the second user's home location of the smart refrigerator. As such, upon determining that it is the defined particular time of day, the AI engine may evaluate geolocation data transmitted from the user device associated with the second user. If there is a match indicating that the second user is at the defined location, the AI engine may send a request to a transaction system to automatically execute the associated conditional transaction, which may include transferring money from the first user's account to the second user's account.

In another example, where an additional condition must be satisfied to trigger execution of a financial transaction, a first user may set up a condition that if a connected second user initiates a transaction when the balance of a prepaid phone used by the second user is lower than a prespecified balance threshold, a request will be transmitted to approve the financial transaction. An additional condition may be defined, tied to the age of the second user, such that the financial transaction will only be executed if the second user is older than a certain age. As such, upon determining that it is below the defined balance threshold, the AI engine may evaluate age data associated with the second user. If there is a match indicating that the second user is older than the certain age, the AI engine may send a request to a transaction system to automatically execute the associated conditional transaction, which may include transferring money from the first user's account to the second user's account.

The unique integration of disparate systems provides a system that is able to facilitate the automatic execution of a transaction at an optimal instance when a condition has been satisfied as well as providing optimized and multi-factor electronic conditional transaction processing within the almost instant approval time requirement for financial transactions.

As described herein, an AI-based system facilitates smart conditional transaction processing for connected users. For example, the AI-based system may automatically identify and facilitate a consequential transaction based on the occurrence of a smart condition, which may include a financial transaction of a payment or request for payment, between connected users in response to occurrence of a user or system defined condition. The AI-based system may store an association between the connected users. The association may be transmitted from the AI-based system to a financial institution system, or to other electronic transaction system. The association may be stored on the financial institution's, or the other transaction system's backend system. For example the association may include a link between account identifiers (e.g., account holder names, account holder usernames, account numbers, and/or the like), mobile device identifiers (e.g., mobile device numbers, mobile device carriers, mobile device application identifiers, device UUIDs, device UDIDs), transaction cards (e.g., transaction card identifiers, transaction card numbers, and/or the like) of the connected users, and other demographic identifiers (e.g., geolocation, social security number, date of birth, email address, phone number, employee identification number, student identification number, profile picture, and/or the like). Accordingly, using the association linking the connected users, upon determining that a condition has occurred, the AI-based system may transmit a notification that suggests or automatically triggers the execution of the associated transaction between the connected users.

FIG. 1 depicts an integrated system 100 for conditional electronic transaction processing according to an example embodiment. As shown in FIG. 1, the integrated system 100 may include one or more user devices 110, an AI-based system 120, and one or more account provider systems 130 connected over one or more networks 140.

The user device 110, AI-based system 120, and account provider system 130 may each include a network-enabled computer system and/or device. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The network-enabled computer systems may execute one or more software applications to, for example, receive data as input from an entity accessing the network-enabled computer system, process received data, transmit data over a network, and receive data over a network.

The user device 110, AI-based system 120, and account provider system 130 may each include at least one central processing unit (CPU), which may be configured to execute computer program instructions to perform various processes and methods. The at least one CPU may comprise several processors, a single processor, or a single device having multiple processors.

The user device 110, AI-based system 120, and account provider system 130 may each include a data storage, including for example, random access memory (RAM) and read only memory (ROM), which may be configured to access and store data and information and computer program instructions. The data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel® file, Microsoft® Access® file, a solid state storage device, which may include an all flash array, a hybrid array, or a server-side product, enterprise storage, which may include online or cloud storage, or any other storage mechanism.

Although depicted as single elements, it should be appreciated that according to one or more embodiments, the user device 110, AI-based system 120, and account provider system 130, may each comprise a plurality of user devices 110, AI-based systems 120, and account provider systems 130. As shown in FIG. 1, the user device 110, AI-based system 120, and account provider system 140 may each include various components. As used herein, the term "component" may be understood to refer to computer executable software, firmware, hardware, and/or various combinations thereof. It is noted there where a component is a software and/or firmware component, the component is configured to affect the hardware elements of an associated system. It is further noted that the components shown and described herein are intended as examples. The components may be combined, integrated, separated, or duplicated to support various applications. Also, a function described herein as being performed at a particular component may be performed at one or more other components and by one or more other devices instead of or in addition to the function performed at the particular component. Further, the components may be implemented across multiple devices or other components local or remote to one another. Additionally, the components may be moved from one device and added to another device, or may be included in both devices.

As depicted in FIG. 1, the user device 110 may be any device capable of communicating via, for example, Bluetooth technology, NFC technology, WiFi Direct technology, and/or the like. The user device 110 may be configured to execute various functions to transmit and receive user data (e.g., smart transaction conditions, card number, account type, account balance, account limits, budget data, recent transactions, and/or the like). For example, the user device 110 could be an iPhone, iPod, iPad, and/or Apple Watch from Apple® or other mobile device running Apple's iOS operating system, devices running Google's Android® operating system, including, for example, smartphones running the Android® operating system and other wearable mobile devices, such as Google Glass or Samsung Galaxy Gear Smartwatch, devices running Microsoft's Windows® Mobile operating system, and/or any other smartphone, smartwatch, tablet, or like device, which may include personal assistant devices incorporating systems, such as Alexa, Siri, Google Assistant, and Microsoft Cortana, including home assistant devices such as Amazon Echo, Google Home, and the like.

In some embodiments, the user device 110 may include smart devices within a home (e.g., thermostat, smart kitchen appliances such as freezer or fridge) that may be capable of detecting unsafe situations in a home. Upon detection of an unsafe situation, such smart appliances may send signals via an application that alerts people to provide a monetary donation to alleviate the unsafe situation. An example of this would be a smart thermostat disposed in an elderly person's home. If the temperature is detected to be out of a preconfigured temperature range that may be defined as a smart condition, the application on the smart thermostat will alert people who have signed up to participate in the service. These people can then offer to donate a small amount of money to pay for a portion of the heat or AC. Once the thermostat receives notice of the funding, the funding will be paid directly and automatically to the utility service. Another example could include monitoring food levels in a smart refrigerator, and allowing users to crowd-fund a grocery delivery service. Such unsafe situations may occur to certain populations that cannot afford particular items, including utilities and basic necessities. The present disclosure can provide systems and methods for concerned citizens to provide small donations to directly improve another's living situation. This crowd-sourcing solution may create a larger impact without needing each contributing person to commit a lot of money, time, or effort to help. In addition, this crowd-sourcing solution can provide the benefit of delivering assistance in a timely manner, when that assistance is likely to be most beneficial (e.g., assistance with paying for heat or AC when the thermostat indicates it is necessary).

The user device 110 may include components to send and/or receive data for use in other components, such as a communication interface 112. The communication interface 112 may include various hardware and software components, such as, for example, a repeater, a microwave antenna, a cellular tower, or another network access device capable of providing connectivity between network mediums. The communication interface 112 may also contain various software and/or hardware components to enable communication over the network 140. For example, the communication interface 112 may be capable of sending or receiving signals via the network 140. Moreover, the communication interface 112 may provide connectivity to one or more wired networks and may be capable of receiving signals on a first medium (such as a wired network) and transmitting the received signals on a second medium (such as a wireless network). One or more connected users may access the network 140 through one or more user devices 110 that may be communicatively coupled to the network 140.

A current location of the user device 110 may be determined using many different technologies such as GPS technology, Internet-based technology, etc., which may utilize location data. By way of example, location data may include, but is not limited to GPS data, assisted GPS data, IP address data, cell identification data, received signal strength indication (RSSI) data, wireless fingerprinting data, inertial sensor data (e.g., compass or magnetometer data, accelerometer data, and/or gyroscope data), barometer data, ultrasonic data (e.g., radio-frequency identification (RFID) data, near-field communication (NFC) data), Bluetooth data, and/or terrestrial transmitter data.

The user device 110 may also include various software components to facilitate the conditional transaction processing, which may include account and payment operations, including an application processor (not shown in FIG. 1). For example, the user device 110 may include an operating system such as, for example, the iOS® operating system from Apple®, the Google® Android® operating system, and the Windows Mobile® operating system from Microsoft®. The user device 110 may also include, without limitation, software applications such as mobile banking applications and financial institution applications to facilitate transactions, an NFC application programming interface, and software to enable touch sensitive displays. User device manufacturers may provide software stacks or APIs which allow software applications to be written on top of the software stacks. For example, user device manufacturers may provide, without limitation, a card emulation API to enable NFC card emulation mode, a logic link control protocol (LLCP) API for peer-to-peer communication between user devices, a Bluetooth® API supporting BLE, and a real-time data (RTD) API and a NFC Data Exchange Format (NDEF) API for reading/writing.

The application processor may enable execution of software applications on the user device 110, which may include a user application 114. The user application may comprise instructions for execution on the user device 110. The user application 114 may include various user interfaces, which may leverage account data, user device data, transaction data, wireless data connection, over-the-air data connection, or other means of data transmission to allow user to set up transaction conditions that may be evaluated to automatically facilitate transactions with connected users.

The data used in the user application 114 may be transmitted, for example, from external data sources. The user application 114 may leverage information from public data sources, which may include traffic, weather, financial, legal data information and the like, as well information about an account or account holder, information about a merchant and/or other parties involved in a transaction, rewards information, promotional information, advertising information, and other useful information. The user application 114 may be integrated with or separate from a wallet application, which may be utilized to seamlessly facilitate transactions between connected users based on the future occurrence of a condition.

As depicted in FIG. 1, the AI-based system 120 may include an AI engine 122, an application server 124, a data storage 126, and a communication interface 128. The AI-based system 120 may include data and/or components, systems, and interfaces, including application programming interfaces (APIs) to enable the generation, transmission, and processing of data including digital authentication data.

The AI-based system 120 may access user or system defined smart transaction conditions to make or request a transaction between connected users (e.g., users of the user devices 110). The smart transaction conditions may be defined by a user. For example, a user of a thermostat may define a smart transaction condition that when the temperature indicated by the thermostat is below 60 Fahrenheit degrees in winter time or greater than 75 Fahrenheit in summer time an alert of a transaction request is broadcast by the AI-based system 120 to registered users. The registered users may have registered in advance with the AI-based system 120 to agree to or express interest in making a certain amount of monetary contribution to the user of the thermostat to help pay for the utility. Upon receiving the alert, the registered users may approve or decline the monetary contribution to be transferred from the accounts of the registered users to an account of the user of the thermostat or directly to an account of the utility company. In some embodiments, upon triggering of the smart conditions, the monetary contribution may be automatically transferred without an action (e.g., approval or decline) of the registered users from the accounts of the registered users to the account of the user of the thermostat or directly to the account of the utility company. A notification may be further issued by the AI-based system 120 to the registered users to notify them of the monetary contribution transfer. In some embodiments, the smart transaction conditions may be defined by the AI-based system 120. For example, based on local weather patterns, the AI-based system 120 may define a smart transaction condition that when the temperature indicated by the thermostat is below 65 Fahrenheit degrees in winter time or greater than 80 Fahrenheit in summer time an alert of a transaction request is broadcast by the AI-based system 120 to registered users. The smart transaction conditions may be stored in the user device 110 and/or the AI-based system 120. The smart transaction conditions may be dynamically modified by the user of the user device 120 or the AI-based system 120.

The AI-based system 120 may have differentiated access to the account provider system 130 and other third party systems, including public data source systems via private APIs. The AI-based system 120 may also have differentiated access to connected user devices (e.g., the user devices 110) via private device APIs. The AI-based system 120 may make calls to the private APIs utilizing a token to provide a secure communication channel between the AI-based system 120 and the account provider system 130 and the other third party systems. The device APIs may also provide a secure communication between the user device 110 and the AI-based system 120.

The AI engine 122 may access user or system defined smart transaction conditions to make or request a transaction between connected users. The smart transaction conditions may be stored in the data storage 126. For example, a user may utilize the user application 114 to set up a condition that whenever a parent user's child says a bad word, the AI-based system 120 will facilitate the transfer of one dollar from the child's account to the parent's account. In another example, a first user may utilize the user application 114 to set up a condition that whenever the balance of the first user's prepaid phone is below a balance threshold, the AI-based system 120 will facilitate the transfer of a certain amount of money from the account of a second user to the account of the first user. The first user may be a senior user who lives on a limited income, and the second user may be a relative or friend of the first user who agrees to help the first user by contributing the certain amount of money to the first user.

The AI engine 122 may receive real time input data from one or more data sources associated with one or more smart transaction conditions, and may utilize AI technologies to parse and process the input data to extract conditionally relevant meaning from the input data. In this example, the AI engine 122 may receive audio data from the child's user device, and may utilize voice recognition and natural language processing technologies to process the input audio data to extract conditionally relevant meaning from the data, which in this example would process and extract meaning from the audio data to determine whether the child had said a bad word.

Accordingly, the AI engine 122 may determine whether the one or more smart conditions is met. Upon determining that the one or more smart transaction conditions has been met, the AI engine 122 may send a request to a transaction system 132 of the account provider system 130 to automatically execute the associated conditional transaction. The determination that the smart condition has been met, in this example, that the child has said a bad word, may trigger the AI engine 122 to call, via an API coupled to the communication interface 128 that communicates with account provider system 130, to automatically facilitate the conditional transaction, transferring one dollar from the child's account to the parent's account.

The AI engine 122 may identify and receive related signals associated with real time input data from one or more data sources associated with one or more smart transaction conditions, and in some examples may perform this operation continuously. The AI engine 122 may utilize AI technologies to parse and process the input data to extract conditionally relevant meaning from the input data. The AI engine 122 may receive the input data that may be collected as a subscription to a stream of data or as a periodic polling of data. The AI engine 122 engine may iteratively collect the most recent data and compare it to the next most recent to determine if any data is new and accordingly need to be parsed and processed to extract conditionally relevant meaning. For example, the application server 124 coupled to the AI engine 122 may receive audio data collected from an audio input source, such as a microphone. The application server 124 may also periodically check and request data from an external data source, such as a weather application system.

The processed data may be aggregated across the one or more data sources. The AI engine 122 may continuously evaluate the aggregated data to determine whether the one or more smart conditions is met. To minimize system resources, the AI-based system 120 may store the compressed aggregated data in the data storage 126. The compressed aggregated data may include the associated conditionally relevant meaning verification and associated metadata necessary to establish proof of occurrence of the condition, rather than the raw received input data. Specifically, the AI-based system 120 may automatically determine whether data is consequential by evaluating whether the data is pertinent to determining whether a smart condition has been met and/or is associated with data that does not satisfy a smart condition. Inconsequential data may be purged by the AI-based system 120 to save storage space. Consequential data may include data of previously processed transactions that may be utilized to predict a likelihood of future transactions. As such, this data that surrounds transactions (in time), which may be inferred to be consequential based on patterns, may also be stored in the data store.

For example, for a condition for which the AI-based system 120 facilitates the transfer of ten dollars from a parent's account to a child's account if the parent user's child does not say a bad word more than two times in a month, the AI-based system 120 upon receiving associated audio input from a child's user device, may utilize a counter to incrementally store the number of times the child has said a bad word rather than the actual received audio signal and/or specific text of the bad word said. The AI-based system 120 may also store the associated metadata, including the date and time of the bad word instance. The AI-based system 120 may also be configured to store the actual audio signal and/or specific text of the bad word itself, such that the parent user may retrieve the specific text of the bad word to confirm the occurrence of the associated condition, for example, that the bad word had been said, prior to facilitating the associated conditional transaction.

Upon determining that the one or more smart transaction conditions has been met, the AI engine 122 may notify the user or send a request to the transaction system 132 of the account provider system 130 to automatically execute the associated conditional transaction. The AI engine 122 may transmit via the communication interface 128 a push notification to the user device 110 via the user application 114. The push notification may include data indicative the executed conditional transaction. The AI engine 122 may generate an audit log that records executed conditional transactions.

The account provider system 130 may include systems associated with, for example, a banking service company such as Capital One®, Bank of America®, Citibank®, Wells Fargo®, Sun Trust®, various community banks, and the like, as well as a number of other financial institutions such as Visa®, MasterCard®, and American Express® that issue credit and/or debit cards, for example, as transaction cards. The account provider system 130 may include and/or be connected to one or more computer systems and networks to process transactions. For example, the account provider system 130 may process transactions as shown and described in FIGS. 4 and 5 below. The account provider system 130 may include systems associated with financial institutions that issue transaction cards, including dynamic transaction cards, and maintains a contract with card-holders for repayment. In various embodiments, the account provider system 130 may issue credit, debit, and/or stored value account. The account provider system 130 may include, by way of example and not limitation, depository institutions (e.g., banks, credit unions, building societies, trust companies, mortgage loan companies, pre-paid gift cards or credit cards, etc.), contractual institutions (e.g., insurance companies, pension funds, mutual funds, etc.), investment institutions (e.g., investment banks, underwriters, brokerage funds, etc.), and other non-bank financial institutions (e.g., pawn shops or brokers, cashier's check issuers, insurance firms, check-cashing locations, payday lending, currency exchanges, microloan organizations, crowd-funding or crowd-sourcing entities, third-party payment processors, etc.)

The account provider system 130 may include a transaction system 132 and a data storage 134. The transaction system 132 may include various hardware and software components to communicate between a merchant system, an account provider system, and/or a user device to process a transaction, such as money transfer. The data storage 134 may store data associated with an accounts of connected users (e.g., card number, account type, account balance, account limits, budget data, recent transactions, pairing data such as time and date of pairing with a mobile de-vice, and the like) and account holder data (e.g., account holder name, address, phone number(s), email address, demographic data, and the like).

The network 140 may be one or more of a wireless network, a wired network or any combination of wireless network and wired network. Network 140 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g, a Bluetooth network, or any other wired or wireless network for transmitting and receiving a data signal.

In addition, the network 140 may include, without limitation, telephone lines, fiber optics, IEEE Ethernet 902.3, a wide area network ("WAN"), a local area network ("LAN"), a wireless personal area network ("WPAN"), a wide body area network ("WBAN") or a global network such as the Internet. Also network 140 may support an Internet network, a wireless communication network, a cellular network, or the like, or any combination thereof. Network 140 may further include one network, or any number of the example types of networks mentioned above, operating as a stand-alone network or in cooperation with each other. Network 140 may utilize one or more protocols of one or more network elements to which they are communicatively coupled. Network 140 may translate to or from other protocols to one or more protocols of network devices. Although network 140 is depicted as a single network, it should be appreciated that according to one or more embodiments, network 140 may comprise a plurality of interconnected networks, such as, for example, the Internet, a service provider's network, a cable television network, corporate networks, and home networks.

Figure 2:
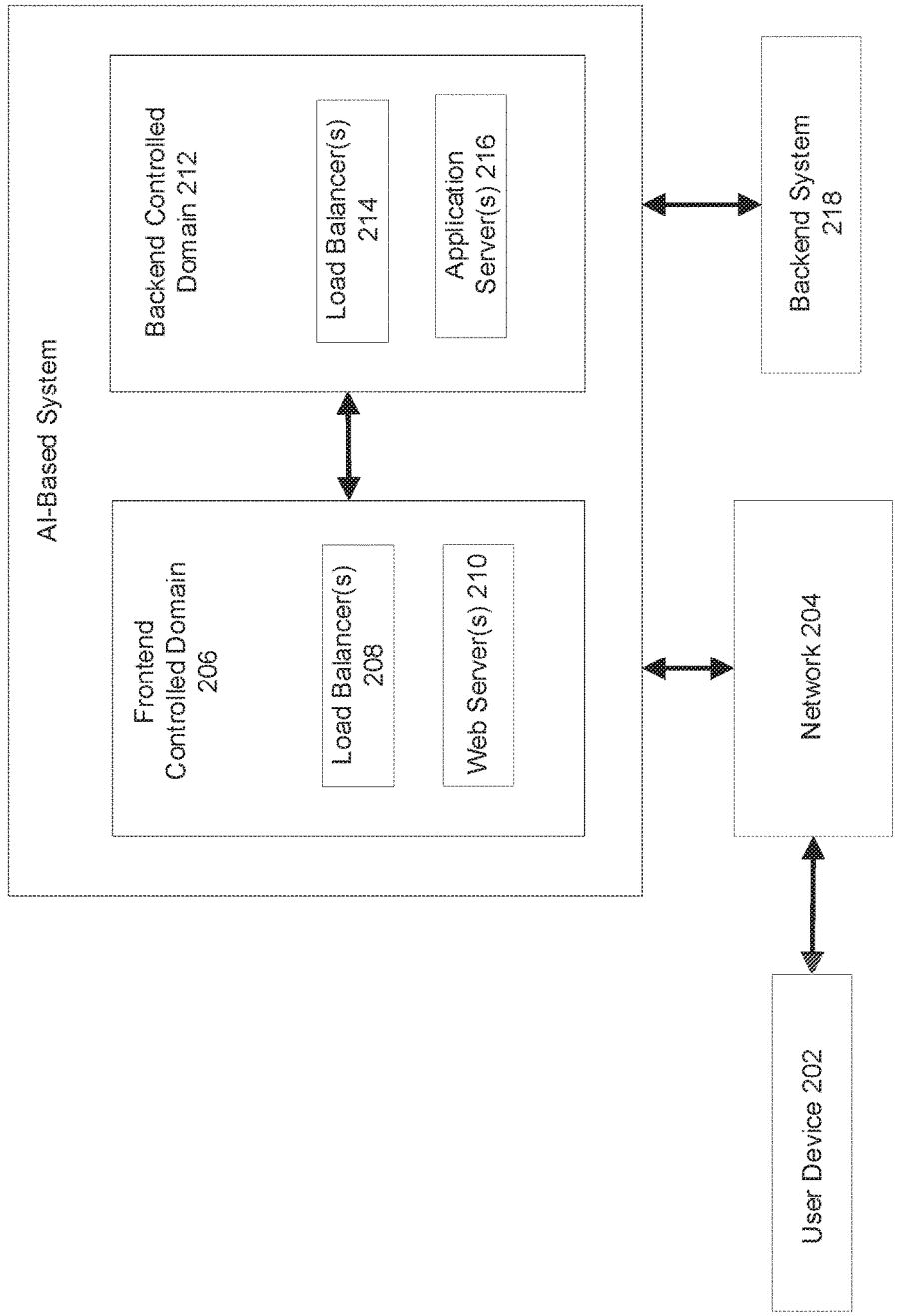
FIG. 2 depicts an example system including an AI-based system for conditional electronic transaction processing, according to embodiments of the present disclosure.

Referring to FIG. 2, an example system 200 may include an AI-based system that facilitates conditional electronic transaction processing. The example system 200 may include a user device 202, which may be similar to the user device 110, a network 204, which may be similar to the network 140, a frontend controlled domain 206, a backend controlled domain 212, and a backend system 218. The frontend controlled domain 206 may include one or more load balancers 208 and one or more web servers 210. The backend controlled domain 212 may include one or more load balancers 214 and one or more application servers 216.

The user device 202 may be a network-enabled computer. As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of the example system 200 may execute one or more software applications to enable, for example, network communications.

The user device 202 may include an iPhone®, iPod®, iPad®, and/or Apple Watch® from Apple® or any other mobile device running Apple's iOS® operating system, any device running Google's Android® operating system, including for example, Google's wearable device, Google Glass®, any device running Microsoft's Windows® Mobile operating system, and/or any other smartphone or like wearable mobile device.

The network 204 may be one or more of a wireless network, a wired network, or any combination of a wireless network and a wired network. For example, the network 204 may include one or more of a fiber optics network, a passive optical network, a cable network, an Internet network, a satellite network, a wireless LAN, a Global System for Mobile Communication (GSM), a Personal Communication Service (PCS), a personal area network, (PAN), D-AMPS, Wi-Fi, fixed wireless data, IEEE 802.11b, 802.15.1, 802.11n, and 802.11g or any other wired or wireless network for transmitting and receiving a data signal.

In addition, the network 204 may include, without limitation, telephone lines, fiber optics, IEEE Ethernet 902.3, a wide area network (WAN), a local area network (LAN), a wide body area network ("WBAN") or a global network such as the Internet. Also, the network 204 may support an Internet network, a wireless communication network, a cellular network, or the like, or any combination thereof. The network 204 may further include one network, or any number of example types of networks mentioned above, operating as a stand-alone network or in cooperation with each other. The network 204 may utilize one or more protocols of one or more network elements to which they are communicatively coupled. The Network 204 may translate to or from other protocols to one or more protocols of network devices. Although the network 204 is depicted as a single network, it should be appreciated that according to one or more embodiments, the network 204 may comprise a plurality of interconnected networks, such as, for example, the Internet, a service provider's network, a cable television network, corporate networks, and home networks.

The frontend controlled domain 206 may be implemented to provide security for the backend system 218. The load balancer(s) 208 may distribute workloads across multiple computing resources, such as, for example computers, a computer cluster, network links, central processing units or disk drives. In various embodiments, the load balancer(s) 208 may distribute workloads across, for example, the web server(s) 210 and/or the backend system 218. Load balancing aims to optimize resource use, maximize throughput, minimize response time, and avoid overload of any one of the resources. Using multiple components with load balancing instead of a single component may increase reliability through redundancy. Load balancing is usually provided by dedicated software or hardware, such as a multilayer switch or a Domain Name System (DNS) server process.

The load balancer(s) 208 may include software monitoring a port where external clients, such as, for example, the user device 202, connect to access various services of a financial institution, for example. The load balancer(s) 208 may forward requests to one of the web servers 210 and/or the backend system 218, which may then reply to the load balancer 208. This may allow the load balancer(s) 208 to reply to the user device 202 without the user device 202 ever knowing about the internal separation of functions. It also may prevent user devices from contacting backend servers directly, which may have security benefits by hiding the structure of the internal network and preventing attacks on the backend system 218 or unrelated services running on other ports, for example.

A variety of scheduling algorithms may be used by the load balancer(s) 208 to determine which backend server should receive a request. Simple algorithms may include, for example, random choice or round robin. The load balancer(s) 208 also may account for additional factors, such as a server's reported load, recent response times, up/down status (determined by a monitoring poll of some kind), number of active connections, geographic location, capabilities, or how much traffic it has recently been assigned.

The load balancer(s) 208 may be implemented in hardware and/or software. The load balancer(s) 208 may implement numerous features, including, without limitation: asymmetric loading; priority activation: SSL Offload and Acceleration; Distributed Denial of Service (DDoS) attack protection; HTTP/HTTPS compression; TCP offloading; TCP buffering; direct server return; health checking; HTTP/HTTPS caching; content filtering; HTTP/HTTPS security; priority queuing; rate shaping; content-aware switching; client authentication; programmatic traffic manipulation; firewall; and intrusion prevention systems.

The web server(s) 210 may include hardware (e.g., one or more computers) and/or software (e.g., one or more applications) that deliver web content that can be accessed by, for example a client device (e.g., the user device 202) through a network (e.g., the network 204), such as the Internet. In various examples, the web server(s) 210, may deliver web pages, relating to, for example, online banking applications and the like, to clients (e.g., the user device 202). The web server(s) 210 may use, for example, a hypertext transfer protocol (HTTP/HTTPS or sHTTP) to communicate with the user device 202. The web pages delivered to the user device 202 may include, for example, HTML documents, which may include images, style sheets and scripts in addition to text content.

A user agent, such as, for example, a web browser, web crawler, or native mobile application, may initiate communications by making a request for a specific resource using HTTP/HTTPS and the web server(s) 210 may respond with the content of that resource or an error message if unable to do so. The resource may be, for example a file on stored on the backend system 218. The web server(s) 210 also may enable or facilitate receiving content from the user device 202 so the user device 202 may be able to, for example, submit web forms, including uploading of files.

The web server(s) 210 may also support server side scripting using, for example, Active Server Pages (ASP), PHP, or other scripting languages. Accordingly, the behavior of the web server(s) 210 can be scripted in separate files, while the actual server software remains unchanged.

The load balancers 214 may be similar to load balancers 208 as described above.

The application server(s) 216 may be similar to the application server 124, as described above and may include hardware and/or software that is dedicated to the efficient execution of procedures (e.g., programs, routines, scripts) for supporting its applied applications. The application server(s) 216 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Also, the application server(s) 216 may act as a set of components accessible to, for example, a financial institution, or other entity implementing the example system 200, through an API defined by the platform itself. For web applications, these components may be performed in, for example, the same running environment as the web server(s) 210. The application server(s) 216 may support the construction of dynamic pages. The application server(s) 216 also may implement services, such as, for example, clustering, failover, and load balancing. In various embodiments, where the application server(s) 216 are Java application servers, the application server(s) 216 may behave like an extended virtual machine for running applications, transparently handling connections to databases associated with the backend system 218 on one side, and connections to the web client (e.g., user device 202) on the other side.

The backend system 218 may include hardware and/or software that enables the backend services of, for example, a financial institution, merchant, acquisition or other entity that maintains a distributed system similar to the example system 200. For example, the backend system 218 may include, a system of record, online banking applications, encryption applications, BLE/Bluetooth connection platforms, a rewards platform, a payments platform, a lending platform including the various services associated with (for example, auto and home lending platforms), a statement processing platform, one or more platforms that provide mobile services, one or more platforms that provide online services, a card provisioning platform, a general ledger system, and/or a location system, which may include additional capabilities, such as transaction card data generation, transaction processing, and/or transmission of account and/or transaction data. The backend system 218 may be associated with various databases, including account databases that maintain, for example, cardholder information (e.g., demographic data, credit data, cardholder profile data, and the like), transaction card databases that maintain transaction card data (e.g., transaction history, account balance, spending limit, budget categories, budget spending, budget limits, and the like), connection information (e.g., public/private key pairs, UUIDs, device identifiers, and the like) and the like. The backend system 218 may also be associated with one or more servers that enable the various services provided by the example system 200. The backend system 218 may enable an online registry system to implement various functions associated with generating an enhanced distributed online registry that determines and provides registry items that are compatible with a customer acquisition.

Figure 3:
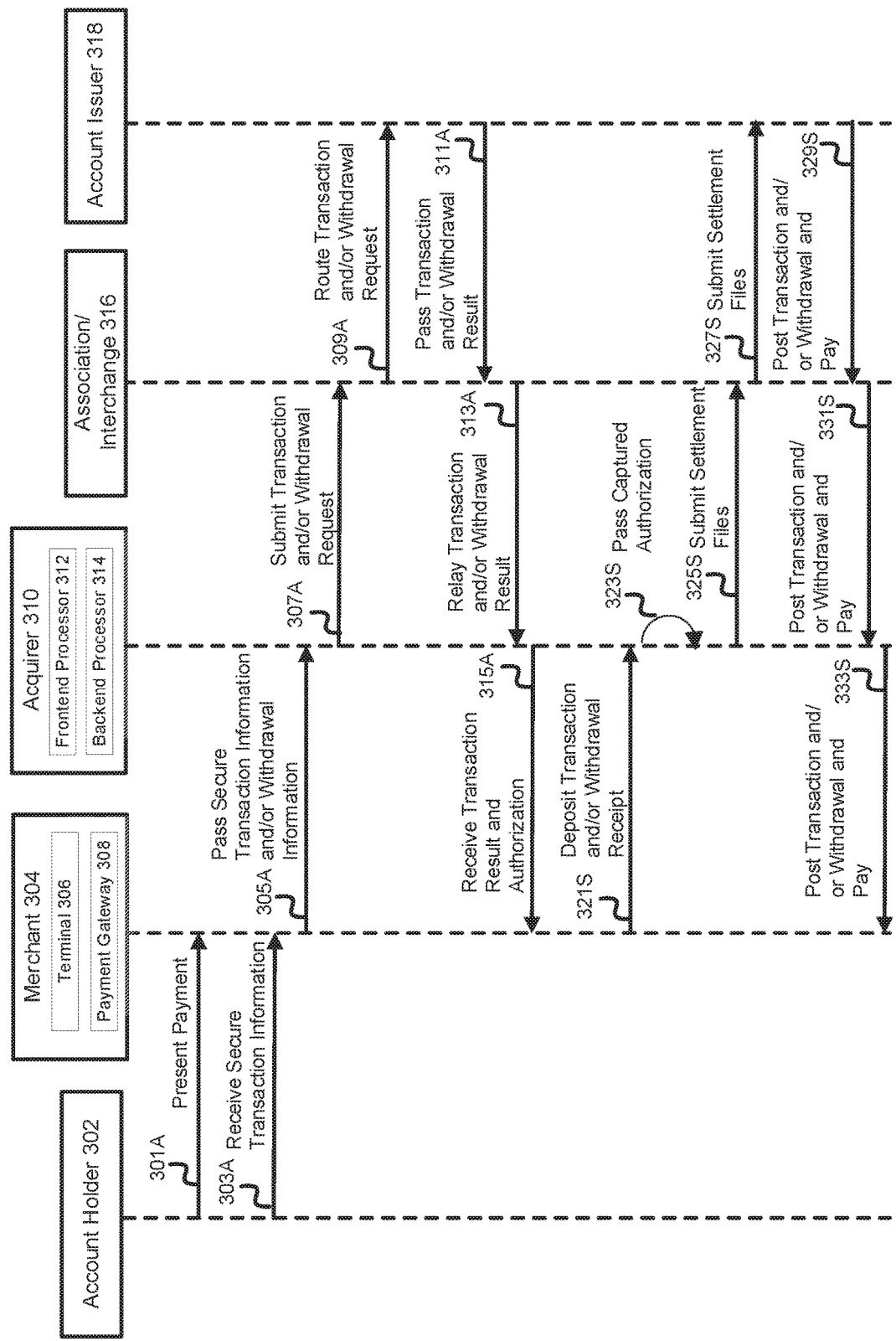
FIG. 3 illustrates an example system and process for conditional electronic transaction processing, according to embodiments of the present disclosure.

FIG. 3 illustrates a system 300 and process for conditional electronic transaction processing according to example embodiments. As shown and described in FIG. 3, account holders, such as withdrawing parties and/or providing parties, and financial institutions may be connected with a card association network to enable secure transactions, timely payments, and successful withdrawals. The system 300 may include an account holder 302, a merchant 304, an acquirer 310, an association/interchange 316, and an account issuer 318.

The account holder 302 may be any withdrawing party and/or account holder, including a credit card holder, debit card holder, stored value card holder and the like. The account holder 302 may be similar to the account holder associated with the user device 110. The account holder 302 may possess a plastic card or carry a device (e.g., a mobile device) that securely stores card credentials and is capable of transmitting the card credentials to, for example, a PoS terminal (e.g., a terminal 306) and/or an input/output module. The account holder 302 may interact with a merchant and/or a providing party (e.g., the merchant 304) by presenting a card or card credentials to a terminal (e.g., the terminal 306).

The merchant 304 may be any merchant that accepts payment from a cardholder in exchange for a small donation to another's living situation (e.g., toward heating furnace gas purchase for a senior person), for example. The merchant 304 may be any retailer, service provider, business entity, or individual that accepts payments. The merchant 304 may include software, firmware and hardware for accepting and/or processing payments. For example, as illustrated in FIG. 3, the merchant 304 may include the terminal 306 and a payment gateway 308. The terminal 306 and payment gateway 308 may comprise the physical or virtual device(s) used by the merchant 304 to communicate information to a frontend processor 312 of the acquirer 310. The terminal 306 may be similar to a PoS system. In various embodiments, the payment gateway 308 may be an e-commerce application service provider service that authorizes payments for merchants. As such, the payment gateway 308 may be a virtual equivalent of a PoS terminal and interface with, for example, a billing system of the merchant 304 and pass data to the frontend processor 312 of the acquirer 310.

The acquirer 310 may be, for example, a financial institution or bank that holds the contract for providing payment processing services to the merchant 304. The merchant 304 may have a merchant account that may serve as a contract under which the acquirer 310 may extend a line of credit to a merchant who wishes to accept, for example, credit card transactions. As shown in FIG. 3, the acquirer 310 may be associated with the frontend processor 312 and a backend processor 314.

In various examples, the frontend processor 312 may be a platform that the card terminal 306 and/or payment gateway 308 communicate with when approving a transaction and/or withdrawal. The frontend processor 312 may include hardware, firmware, and software to process transactions and/or withdrawals. The frontend processor 312 may be responsible for the authorization and capture portion of credit card transaction. The frontend processor 312 also may include additional frontend platform interconnections to support, for example, automated clearing house (ACH) and debit transactions.

The backend processor 314 may be a platform that takes captured transactions from the frontend processor 312 and settles them through an interchange system (e.g., the association/interchange 316). The backend processor 314 may generate, for example, daily ACH files for merchant settlement. The backend processor 314 also may handle chargeback handling, retrieval request and monthly statements.

The association/interchange 316 may be the consumer payment system whose members are the financial institutions that issue payment cards and/or sign merchant to accept payment cards. Example associations/interchanges 316 may include, Visa®, MasterCard®, and American Express®. The association/interchange 316 may include one or more computer systems and networks to process transactions.

The account issuer 318 may be a financial institution that issues payment accounts/cards and maintains a contract with accountholders/cardholders for repayment. In various embodiments, the account issuer 318 may issue credit, debit, and/or stored value cards, for example. Example issuers may include, Capital One®, Bank of America®, Citibank®, Sun Trust®, and the like.

In various embodiments, processing a conditional electronic transaction may involve two stages: (1) authorization and (2) clearing and settlement. Authorization may refer to an electronic request that is sent through various parties to either approve or decline the transaction. Clearing and Settlement may refer to settlement of the parties' settle accounts to enable the parties to get paid.

During authorization, the account holder 302 may present payment account/card as payment (step 301A) at the merchant 304, for example. The merchant 304 may enter card into a physical PoS terminal 306 or submit a credit card/account transaction to a payment gateway 308 on behalf of the account holder 302 via secure connection from a web site, retail location, or a wireless device.

The payment gateway 308 may receive the secure transaction information (step 303A) and may pass the secure transaction information and/or withdrawal information (step 305A) via a secure connection to the acquirer's 310 frontend processor 312.

The frontend processor 312 may submit the transaction and/or withdrawal request (307A) to the association/interchange 316 (e.g., a network of financial entities that communicate to manage the processing, clearing and settlement of credit card transactions). The association/interchange 316 may route the transaction and/or withdrawal request (step 309A) to the issuer 318. The issuer 318 may approve or decline the transaction and/or withdrawal and passes the transaction and/or withdrawal results back (step 311A) through the association/interchange 316. The association/interchange 316 then may relay the transaction and/or withdrawal results (step 313A) to the frontend processor 312.

The frontend processor 312 may relay the transaction results (step 315A) back to the payment gateway 308 and/or terminal 306. The payment gateway 308 may store the transaction and/or withdrawal results and sends them to the merchant 304. The merchant 304 may receive the authorization response and complete the transaction and/or withdrawal accordingly.

During settlement, the merchant 304 may deposit the transaction and/or withdrawal receipt (step 321S) with the acquirer 310 via, for example, a settlement batch. Captured authorizations may be passed (step 323S) from the frontend processor 312 to the backend processor 314 for settlement. The backend processor 314 may generate ACH files for merchant settlement. The acquirer 310 may submit settlement files (steps 325S, 327S) to the issuer 318 for reimbursement via the association/interchange 316. The issuer 318 may post the transaction and/or withdrawal and pay the merchant 304 (steps 329S, 331S, 333S).

Figure 4:
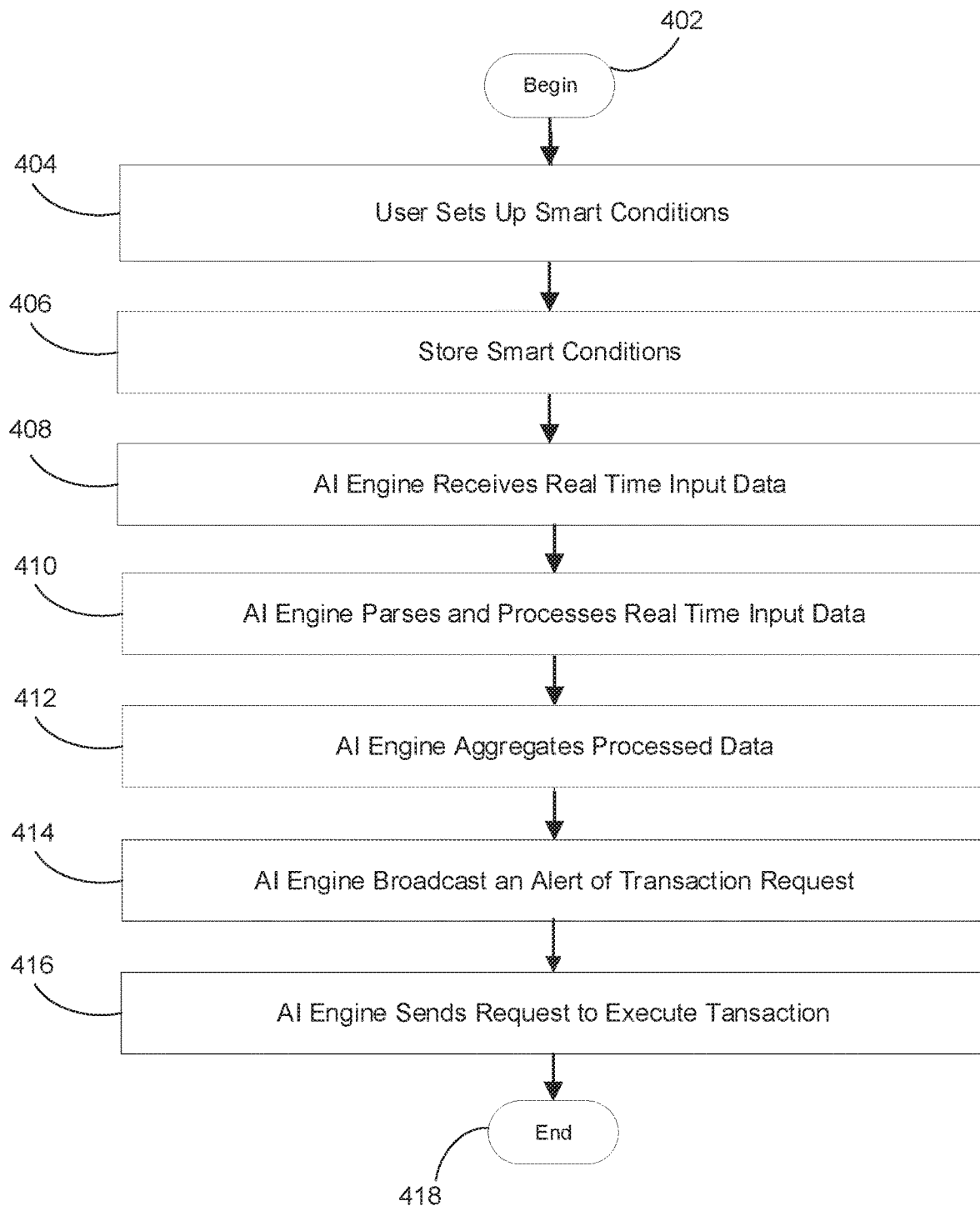
FIG. 4 depicts an example method for conditional electronic transaction processing utilizing AI technologies, according to embodiments of the present disclosure.

FIG. 4 illustrates a method 400 for conditional electronic transaction processing utilizing AI technologies according to example embodiments. The method 400 may begin at block 402. At block 404, a user may utilize various input channels to set up smart conditions to facilitate a transaction, which may include utilization of a web interface, a mobile application like the user application 114 on the user device 110, smart devices such as smart thermostat and smart home appliances, SMS voice recognition systems, such as Alexa, Siri, Google Assistant, and Microsoft Cortana, and the like.

The smart conditions may include conditions that define when to suggest, make or request a transaction based on the occurrence of a condition. Specifically, in one example, the smart conditions may include conditions to make or request a payment. The conditional transaction to be established may be executed between connected users and/or connected accounts. Joint users associated with a group may be able to establish conditional transactions to be executed between the joint users. Example smart conditions may include transferring money from a first user's account to a second user's account whenever the first user says a bad word; requesting money from a first user's account to be transferred to a second user's account when the first user is at a particular location; requesting money from a first user's account to be transferred to a second user's account when the second user's thermostat indicates that the temperature at the second user's home is out of a preconfigured temperature range (e.g., too cold or too hot); requesting money from a first user's account to be transferred to a second user's account when the second user's smart refrigerator indicates that the grocery in the smart refrigerator is below a threshold; requesting money from a first user's account to be transferred to a second user's account when the first user is happy; requesting money from a first user's account to be transferred to a second user's account when the second user's prepaid phone indicates that the prepaid balance is below a threshold; approving a second user's request for a transfer of money from a first user when the second user spends less that a specified time on a particular user device, which may include playing games on an iPad; requesting money from a first user's account to be transferred to a second user's account if a particular sports team wins a game, or if a particular new law or regulation is enacted;

purchasing shares of stock when the stock price goes up a certain percentage over a specified number of consecutive days; transferring money from a user's checking account to a savings account based on the occurrence of an event such as a family member's birthday, upcoming holiday, upcoming vacation, and the like.

In another example, the smart conditions may include permission controls which may be utilized to facilitate a user to opt in or opt out of the associated smart condition transaction processing and the sharing of associated user data. For example, a conditional transaction between a first user and a second user may include a permission control which allows the second user to accept or decline the smart conditional transaction upon occurrence of the associated condition. A conditional transaction between a first user and a second user may also include a confirmation control configured to require the first user to confirm execution of the smart transaction condition upon the occurrence of the associated condition before execution of the transaction. Additionally a conditional transaction may include a permission control that prompts a specific user to grant permission to share the necessary data to be evaluated for the associated conditional transaction processing, which may include voice, facial recognition, location, device usage data, and the like. Joint users that may be associated with a particular group may customize the level of permissions they want to give to the other users in the same group. These permissions may control the sharing of user and account data, the ability to set up conditional transaction processing, and confirmation of the execution of a smart transaction condition prior to completion of the associated transaction.

According to block 406, the smart transaction conditions may be securely stored locally in the user application 114, may be stored within the data storage 126 of the AI-based system 120 at block 406, and/or may also be stored within an external data server. A secure connection may be made between the user device 110, the AI-based system 120, and/or the account provider system 130 to transmit the smart transaction conditions to the user device 110, AI-based system 120, and/or account provider system 130, respectively. User identification information of registered users may also be stored in the data storage 124, in the user application 114, and/or within the external data server. The identification information may include, but not limited to, user name, user logging ID, user logging password, home address, email, and home/mobile phone number.

At block 408, the AI engine 122 may receive real time input data securely transmitted from one or more data sources associated with one or more smart conditions. The one or more data sources may include connected user devices, personal device sensors, and/or third party systems, which may include public data sources and financial accounts. The disclosed system may utilize and evaluate encryption, fraud, fund availability controls, and the like, established by the third party systems to determine whether to transmit the associated input data. For example, for a smart condition involving transferring money from a first user's account to a second user's account whenever the first user says a bad word, the input data may include audio data from a first user's user device; for the smart condition involving requesting money from a first user's account to be transferred to a second user's account when the second user's smart refrigerator indicates that the grocery in the smart refrigerator is below a threshold, the input data may include images and video of the smart refrigerator; for the smart condition involving requesting money from a first user's account to be transferred to a second user's account when the second user's smart thermostat indicates that the temperature at the second user's home is out of a preconfigured temperature range, the input data may include images and video of the smart thermostat; for the smart condition involving requesting money from a first user's account to be transferred to a second user's account when the first user is at a particular location, the input data may include geolocation location data from a first user's user device; for the smart condition involving requesting money from a first user's account to be transferred to a second user's account when the second user is at a particular location, the input data may include GPS location data from a second user's user device, which may include place data such as restaurant, store, airport, and the like; for the smart condition involving requesting money from a first user's account to be transferred to a second user's account when the first user is happy, the input data may include image, video or audio data from a first user's device, text data that the first user has typed or use of an emoticon; for the smart condition involving approving a second user's request for a transfer of money from a first user when the second user spends less that a specified time on a particular user device, which may include playing games on an iPad, the input data may include device/application data from a user device; for the smart condition involving requesting money from a first user's account to be transferred to a second user's account if a particular sports team wins a game, or if a particular new law or regulation is enacted, the input data may include public data from a public data source; and for the smart condition involving purchasing shares of stock when the stock price goes up a certain percentage over a specified number of consecutive days, the input data may include public data from a public data source.

The AI engine 122 may collect data from individual or joint users through real time data input sources, like those described above. Users may utilize a user application that is associated with the application server 124, like the user application 114 to consider the level of information they are willing to share with the system. The system may include the data sources, which may include a user device and an account provider system for which the user has an account associated with a financial institution. For example, a smart condition may be configured to include permission controls which may facilitate a user to opt in or opt out of the sharing of associated user data. A user may be prompted via a notification on the user application 114 to grant or decline permission to share the necessary data to be evaluated for the associated conditional transaction processing. The necessary data may include voice, facial recognition, location, device usage data, and the like.

The user may also indicate a user level of interest associated with the one or more transaction conditions. For example, a user may be interested in contributing a small amount of monetary donation to a family whose income is around the local poverty line; and the user may be interested in contributing a large amount of monetary donation to a family whose income is well below the local poverty line. In another example, a particular request may be directed by the AI-based system 120 to particular users based on areas of interest and/or previous giving of the particular users. For example, a particular user may only be interested in contributing a monetary donation to medical bills.

Further, the level of interest may be based on a threshold value of data received from the one or more connected smart devices. The threshold value of data received may be defined by the user who is interested in making a contribution or by the AI-based system 120. In an example, the user may be interested in making the contribution if the data received is below or greater a threshold value, and otherwise may not be interested in contributing anything or may be interested in contributing a reduced amount. For example, a user may be interested in contributing a small amount of monetary donation to a family's heating expense in winter when the local weather temperature is above a threshold temperature; and the user may be interested in contributing a large amount of monetary donation to the family's heating expense in winter when the local weather temperature is below the threshold temperature.

In addition, the level of interest may be based on when the transaction request alert is broadcasted. For example, a user may not be interested in contributing a monetary donation to a family's grocery expense if the transaction request alert is broadcasted to the user at night times. A user may only be interested in contributing a monetary donation to a family's cooling expense in summer when the transaction request alert is broadcasted to the user during summer time. In some embodiments, the transaction request alert may be broadcasted to new users who have not previously registered with the AI-based system 120. The transaction request alert may be broadcasted to the new users via connected family, friends, or location. For example, the transaction request alert may be forwarded by a family member to the new users when the new users are in town.

At block 410, the AI engine 122 may utilize AI technologies to parse and process the input data to extract conditionally relevant meaning from the input data. For example, the AI engine 122 may initially perform signal acquisition and filtering of a signal generated from the input data, which may be followed by further signal compression and decompression, such that the input data is in format of which the AI engine 122 may extract conditionally relevant meaning from the input data. Specifically, the AI engine 122 may utilize AI technologies such as facial recognition, voice recognition and/or natural language processing to translate the received input data into a form that may be utilized by AI engine 122 to evaluate whether one or more of the smart conditions has been met. For example, for the smart condition involving transferring money from a first user's account to a second user's account whenever the first user says a bad word, the AI engine 122 may utilize voice recognition and natural language processing technologies to extract meaning from the voice data of the first user. Specifically the voice recognition and natural language technologies may be utilized to process the input voice data, such that the AI engine 122 may utilize a pattern matching algorithm to compare the AI-processed input voice data to the defined condition, to determine when the AI-processed input data matches the defined condition, to assess whether the first user has said a bad word.

In another example, for the smart condition involving requesting money from a first user's account to be transferred to a second user's account when the first user is happy, the AI engine 122 may utilize AI technologies to parse and process input data from multiple inputs to extract conditionally relevant meaning from the multiple input sources and aggregate them to verify whether a condition has been met. For example, facial recognition technologies may be utilized to process image data of an image of the first user, which may be taken from a camera on a user's mobile device to detect a happy facial expression of the first user. Additionally, voice recognition and natural language processing technologies may also be utilized to process any received audio data of the first user. Geolocation data may also be processed to detect whether a user is happy based on a defined behavior which may include going to a particular location or event. Accordingly, the AI engine 122 may utilize a pattern matching algorithm to aggregate and compare the AI-processed input image, voice data, and geolocation data respectively to the defined condition, to determine when the AI-processed input data matches the defined condition, to assess whether the first user is happy.

At block 412, the processed data may be aggregated across the one or more data sources. For example, a condition may be associated with a particular score. The AI engine 122 may utilize a data aggregator to calculate different data points based on the processed input data. Based on the aggregated data points, the AI engine 122 may utilize an algorithm to generate a score.

The algorithm may utilize specific calculations that utilize parameters to prioritize the input data in generating a score. For example, when the input data is related to contributing a monetary donation to a family's heating expense in winter, the weather input data may be assigned a larger parameter (e.g., 0.6 on a scale of 0-1) whereas the family size data may be assigned a smaller parameter (e.g., 0.05 on the scale of 0-1). The AI engine 122 may compare the generated score to a score associated with the condition to determine to assess whether the condition has been satisfied.

The condition may also include a skill that may be made available to a user. The AI engine 122 may learn new skills by utilizing historical training of data, which may include geolocation, proximity to people, words spoken, images taken, weather, time, demographic data, and the like. The historical training of data may include aggregating such data and associating the data with conditional transactions to determine patterns that predict future conditional transaction processing.

The AI engine 122 may continuously evaluate the aggregated data to determine whether the one or more smart conditions is met.

At block 414, upon determining that the one or more transaction conditions has been met, the AI engine may determine to which users an alert of a transaction request will be broadcast, and subsequently broadcast the alert of the transaction request to the users via applications, for example the application server 124 and the user application 114. The users may be registered users who have signed up for such events, services, activities. For example, when the one or more transaction conditions are related to crown funding a family's summer cooling expense, an alert of a transaction request for contributing a monetary donation may be broadcasted to users who have signed up for such service.

In some embodiments, the AI engine 122 may evaluate a budget associated with a user to determine whether to broadcast an alert of a transaction request to that user. For example, a user may budget no more than 10 dollars to be donated to a family's grocery expense. When the family's grocery expense is relatively small, an alert of a transaction request may be broadcasted to that user. When the family's grocery expense is relatively high, an alert of a transaction request may not be broadcasted to that user.

In some embodiments, the AI engine 122 may determine to which users an alert of a transaction request is broadcasted based on the evaluation of historical data. For example, if the historical data indicates that some users may have made donations before, the alert of the transaction request may be broadcasted to such users. Similarly, if the historical data indicates that some users may have not made donations before, the alert of the transaction request may not be broadcasted to such users.

In some embodiments, a load balancer (e.g., the load balancer 208 or 214) may balance the prioritized parameters to determine to which users an alert of a transaction request will be broadcasted.

At block 416, upon determining that the one or more smart transactions has been met, the AI engine 122 may send a request to the transaction system 132 to automatically execute the associated conditional transaction. The AI engine 122 may transmit via the communication interface 128 a push notification to the user device 110 via the user application 114 that may include data indicative the executed conditional transaction.

In one embodiment, the AI-based system 120 may be utilized for multi-factor conditional transaction processing. Specifically, an initial smart condition may be configured such that upon occurrence of the initial smart condition, a subsequent condition must then be met for the transaction to be executed. The AI engine 122 may continuously evaluate the aggregated data to determine whether the subsequent condition is met. For example, if a parent user sets up a condition that at lunch time, a request will be transmitted to transfer lunch money from a parent's account to a child's account. A further condition may be defined, tied to the geolocation of a user device associated with the child, such that the transaction will only be executed if the child is actually at school. As such, upon determining that it is lunch time, the AI engine 122 will evaluate geolocation data transmitted from the user device of the child. If there is a match, indicating that the child is at school, the AI engine 122 may send a request to the transaction system 132 to automatically execute the associated conditional transaction of transferring lunch money from the parent's account to the child's account. In another example, for a condition for which the AI-based system 120 facilitates the transfer of ten dollars from a parent's account to a child's account if the parent user's child does not say a bad word more than two times in a month based on received audio input from a child's user device. A further condition may be defined, tied to voice recognition associated with the child's voice input, such that the transaction will only be executed if it is actually the identified child rather than a sibling or a classmate that says the bad word. As such, upon determining that a bad word has been said, the AI engine 122 will utilize voice recognition technologies to detect if there is a match, indicating that the identified child did in fact say the bad word.

The smart conditions may also include permission controls which may be utilized to facilitate a user to opt in or opt out of a smart condition transaction processing. For example, a conditional transaction between a first user and a second user may include a permission control which allows the second user to accept or decline the smart conditional transaction upon occurrence of the associated transaction. Upon determining that a condition has been satisfied, the AI engine 122 may transmit a notification to a user device associated with the second user, which may prompt the second user to accept or decline the execution of the associated transaction.

The AI engine 122 may also utilize machine learning and natural language processing to process and cluster the aggregated data, and may utilize a recommendation engine/algorithm to generate recommendations of smart transaction conditions based on user and/or other connected user's previously defined conditions. Specifically, the AI engine 122 may utilize a constant feedback loop to learn about smart conditions that may trigger a transaction to build associations and correlations of the smart conditions and aggregated data to automatically suggest a smart condition that may trigger an associated transaction. For example, the disclosed system may determine that parent users transfer money to their children during lunch time. Based on the system building an association between the transfer of money from parent users to children users and lunch time, and also potentially determination of a child's location at school, the disclosed system may automatically suggest a smart condition to other parent users that triggers parent users transfer money to their children during lunch time.

In some embodiments, the user application 114 may automatically execute a transaction upon receiving a transaction request alert. In other embodiments, the communication interface 128 may transmit the transaction request alert to one or more third party systems, for example the transaction system 132.

In another example, the disclosed system may further learn moments and triggers that may result in a transaction between users. For example, the disclosed system determines that two users are at a particular restaurant. The disclosed system may, based on evaluating aggregated data, automatically suggest a smart trigger condition that if two people are in the same location, and the location is a restaurant, the disclosed system should send a notification asking the users if they would like to split the bill.

The process may end at block 418. Upon completion of the transaction, the completed transaction may be recorded and stored by the AI-based system 120 for further reference or evaluation in the future. The above process can be repeated.

Figure 5:
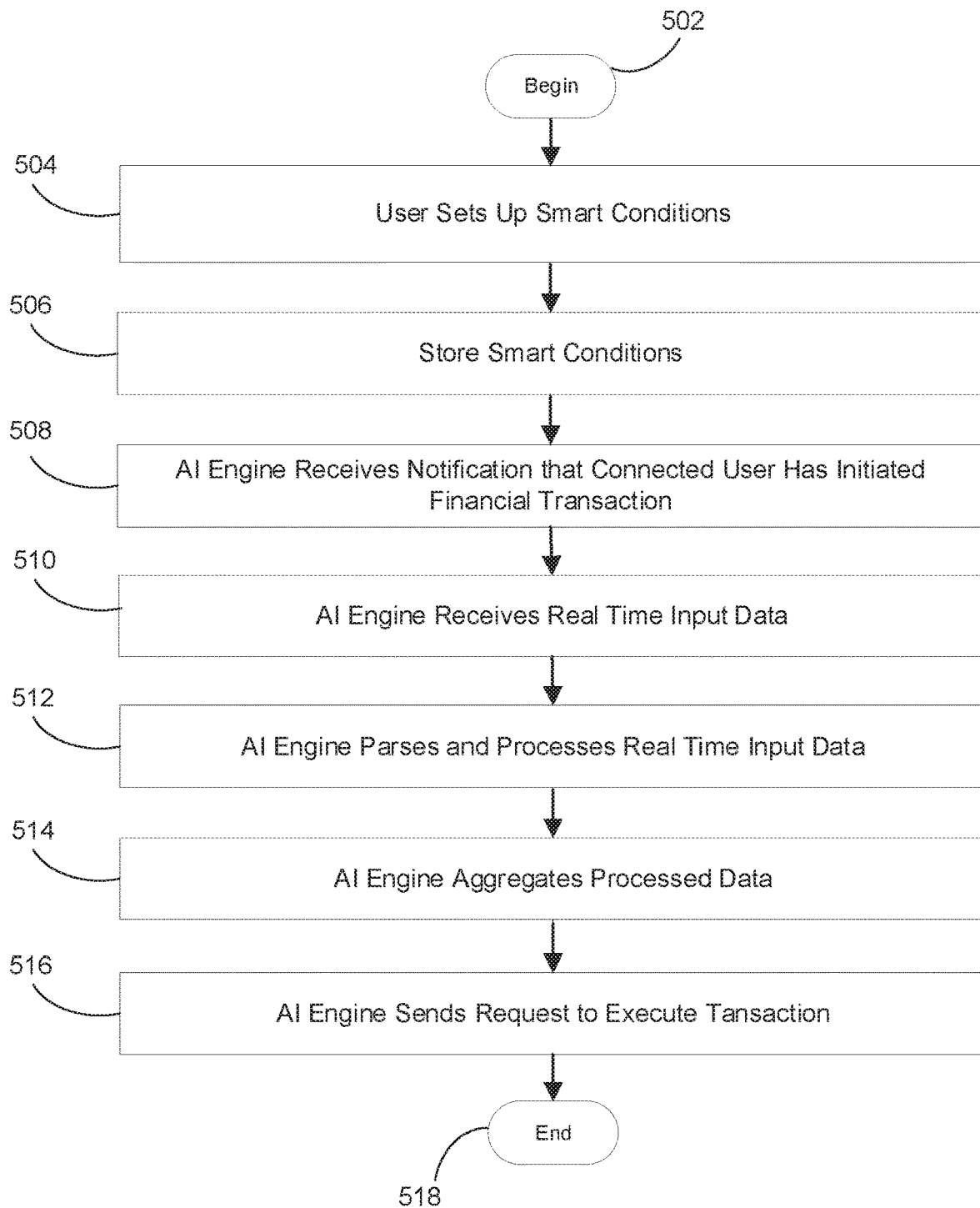
FIG. 5 depicts an example method for approving a financial transaction utilizing AI technologies and conditional transaction processing, according to embodiments of the present disclosure.

FIG. 5 depicts an example method 500 that allows a user to approve a financial transaction utilizing AI technologies for conditional transaction processing at the instant a transaction is initiated, according to embodiments of the present disclosure. The method may begin at block 502. At block 504, a user may utilize various input channels to set up smart conditions to facilitate a transaction, which may include utilization of a web interface, a mobile application like the user application 114 on the user device 110, SMS voice recognition systems, such as Alexa, Siri, Google Assistant, and Microsoft Cortana, and the like. The smart conditions may include conditions that define when to make or request a transaction based on the occurrence of the condition. In one example, the smart conditions may include conditions to make or request a payment. For example, a parent user may define a condition that requires when a connected child user initiates a financial transaction, the parent user must manually approve the financial transaction, or an additional condition must be satisfied which triggers execution of the financial transaction.

According to block 506, the smart transaction conditions may be securely stored locally in the user application 114, may be stored within the data storage 126 of the AI-based system 120 at block 504, and/or may also be stored within an external data server. A secure connection may be made between the user 110, AI-based system 120, and/or account provider system 130 to transmit the smart transaction conditions to the user device 110, AI-based system 120, and/or account provider system 130, respectively.

At block 508, the AI engine 122 may receive a notification that a connected user has initiated a financial transaction. For example a child user may swipe a card, to purchase lunch at school. Upon swiping the card, a parent user may receive a notification via the AI system 120, pushed to a user device of the parent user at the time the transaction is initiated. The parent user may configure the associated smart condition such that the parent user is required to manually approve the child's transaction by sending a response confirming authorization via the parent's user device, upon which a request to a connected transaction system to automatically execute the associated financial transaction is transmitted. If the parent user does not approve the child's transaction, the process may end at 508.

In another embodiment, where an additional condition must be satisfied to trigger execution of the financial transaction, at block 510, the AI engine 122 may receive real time input data securely transmitted from one or more data sources associated with one or more smart conditions The data sources may include connected user devices, personal device sensors, and/or third party systems, which may include public data sources and financial accounts. For example, if a parent user sets up a condition that if a child initiates a transaction at lunch time, a request will be transmitted to approve the financial transaction. A further condition may be defined, tied to the geolocation of a user device associated with the child, such that the transaction will only be executed if the child is actually at school. As such, upon determining that it is lunch time, the AI engine 122 will evaluate geolocation data transmitted from a user device of the child. If there is a match, indicating that the child is at school, the AI engine 122 may send a request to the transaction system 132 to automatically execute the associated conditional transaction of transferring lunch money from the parent's account to the child's account.

At block 512, the AI engine 122 may utilize AI technologies to parse and process the input data to extract conditionally relevant meaning from the input data. For example, the AI engine 122 may initially perform signal acquisition and filtering of a signal generated from the input data, which may be followed by further signal compression and decompression, such that the input data is in format from which the AI engine 122 may extract conditionally relevant meaning from the input data. Specifically, the AI engine 122 may utilize AI technologies such as facial recognition, voice recognition and/or natural language processing to translate the received input data into a form that may be utilized by the AI engine 122 to evaluate whether one or more of the smart conditions has been met.

At block 514, the processed data may be aggregated across the one or more data sources. For example, a condition may be associated with a particular score. The AI engine 122 may utilize a data aggregator to calculate different data points based on the processed input data. Based on the aggregated data points, the AI engine 122 may utilize an algorithm to generate a score. The algorithm may utilize specific calculations that utilize parameters to prioritize the input data in generating a score. The AI engine 122 may compare the generated score to a score associated with the condition to assess whether the condition has been satisfied.

The AI engine 122 may continuously evaluate the aggregated data to determine whether the one or more smart conditions is met.

At block 516, upon determining that the one or more smart transactions has been met, the AI engine 122 may send a request to the transaction system 132 to automatically execute the associated conditional transaction. The AI engine 122 may transmit via the communication interface 128 a push notification to the user device 110 via the user application 114. The push notification may include data indicative the executed conditional transaction.

The process may end at block 518. Upon completion of the transaction, the completed transaction may be recorded and stored by the AI-based system 120 for further reference or evaluation in the future. The above process can be repeated.

The terms "condition" and "transaction" are used throughout this specification and it is understood that the present disclosure is not limited to any particular conditions or transactions. Rather, the present disclosure includes any transaction, activity, or operation and these transactions, activities, and operations can be subject to any condition, prerequisites, or requirements.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

In the preceding specification, various preferred embodiments have been described with references to the accompanying drawings. It may, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

What is claimed is:

1. An artificial intelligent (AI)-based system for an automated crowd-sourced payment service based on detection of an unsafe household condition, comprising:
 a data storage containing:
  a plurality of user identification records associated with a plurality of users registered for the automated crowd-sourced payment service,
  one or more threshold values associated with each of a plurality of registered users, wherein the one or more threshold values correspond to one or more unsafe household conditions detected by one or more smart home appliances, and
  an automated action specified for each of the one or more threshold values;
 an AI engine coupled to an application programming interface (API) that enables acquisition of real time sensing data from the one or more smart home appliances, wherein the AI engine is configured to:
receive the real time sensing data from the one or more smart home appliances, the one or more smart home appliances comprising a smart thermostat for real time monitoring of a household temperature, and a smart refrigerator sensor for real time monitoring of a food level within the smart refrigerator associated with the household;
continuously monitor the real time sensing data, retrieved from the one or more smart home appliances, with respect to the one or more threshold values;
determine one or more data values from the real time sensing data, that indicate an unsafe household condition based on a comparison with one or more corresponding threshold values;
identify, from the plurality of user identification records, one or more registered users associated with the one or more corresponding threshold values for which an unsafe household condition is detected;
broadcast an alert, regarding the detected unsafe household condition, to the one or more registered users along a request for execution of the automated action specified for the corresponding threshold values by a corresponding user, the automated action corresponding to a transaction request for a monetary contribution to alleviate the detected unsafe condition, the alert being broadcasted to a user application running on a user device associated with each of the one or more registered users.

2. The smart device system of claim 1, wherein the AI engine is further configured to evaluate one or more prioritized parameters to determine a user level of interest of a registered user for each of the one or more threshold values associated with an unsafe household conditions.

3. The AI-based system of claim 2, wherein the one or more prioritized parameters are specified by the registered user.

4. The AI-based system of claim 2, wherein the AI engine is configured to evaluate a budget associated with the registered user prior to transmission of the request for execution of the automated action.

5. The AI-based system of claim 1, wherein the user application is configured to automatically execute the transaction request for a monetary contribution upon receiving the alert regarding the detected unsafe household condition.

6. The AI-based system of claim 1, wherein the AI engine is configured to identify the one or more registered users for transmission of the transaction request based on an evaluation of historical data associated with each of the one or more registered users.

7. The AI-based system of claim 1, wherein a notice of funding for each of one or more transaction requests accepted by a corresponding registered user is sent to the one or more smart home appliances.

8. An AI-based method for implementing an automated crowd-sourced payment service based on detection of an unsafe household condition, comprising:
receiving, by a processor running an AI engine, a real time sensing data from one or more smart home appliances, the smart home appliances comprising a smart thermostat for real time monitoring of a household temperature, and a smart refrigerator sensor for real time monitoring of a food level within the smart refrigerator associated with the household;
monitoring, by the AI engine, the real time sensing data, retrieved from the one or more smart home appliances, with respect to against one or more threshold values;
determining, by the AI engine, one or more data values from the real time sensing data, that indicate an unsafe household condition based on a comparison with one or more corresponding threshold values;
identifying, by the AI engine, one or more registered users, from a plurality of user identification records, the one or more registered, users being associated with the one or more corresponding threshold values for which an unsafe household condition is detected; and
broadcasting, by the processor, an alert, regarding the detected unsafe household condition, to the one or more registered users along a request for execution of an automated action specified for the corresponding threshold values by a corresponding user, the automated action corresponding to a transaction request for a monetary contribution to alleviate the detected unsafe condition, the alert being broadcasted to a user application running on a user device associated with each of the one or more registered users.

9. The AI-based method of claim 8, further comprising evaluating one or more prioritized parameters to determine a level of interest of a registered user for each of the one or more threshold values associated with an unsafe household conditions.

10. The AI-based method of claim 9, wherein the one or more prioritized parameters are specified by the registered user.

11. The AI-based method of claim 9, further comprising evaluating a budget associated with the registered user prior to transmission of the request for execution of the automated action.

12. The AI-based method of claim 8, further comprising automatically executing the transaction request for a monetary contribution upon receiving the alert regarding the detected unsafe household condition.

13. The AI-based method of claim 8, wherein a notice of funding for each of one or more transaction requests accepted by a corresponding registered user is sent to the one or more smart home appliances.

14. The AI-based system of claim 2, further comprising a balancer that balances the one or more prioritized parameters to identify the one or more registered users for transmission of the transaction request.

15. The AI-based method of claim 9, further comprising balancing the one or more prioritized parameters to identify the one or more registered users for transmission of the transaction request.

16. A non-transitory computer-accessible medium having stored thereon computer-executable instructions for implementing an automated crowd-sourced payment service based on detection of an unsafe household condition, wherein upon execution by a computer arrangement comprising a processor, the instructions cause the computer arrangement to perform procedures comprising:
receiving, by an AI engine running on the processor, real time sensing data from one or more smart home appliances, the smart home appliances comprising a smart thermostat for real time monitoring of a household temperature, and a smart refrigerator sensor for real time monitoring of a food level within the smart refrigerator associated with the household;
monitoring, by the AI engine, the real time sensing data, retrieved from the one or more smart home appliances, with respect to one or more threshold values;

determining, by the AI engine, one or more data values from the real time sensing data, that indicate an unsafe household condition based on a comparison with one or more corresponding threshold values;

identifying, by the AI engine, one or more registered users, from a plurality of user identification records, the one or more registered, users being associated with the one or more corresponding threshold values for which an unsafe household condition is detected; and broadcasting, by the processor, an alert, regarding the detected unsafe household condition, to the one or more registered users along a request for execution of an automated action specified for the corresponding threshold values by a corresponding user, the automated action corresponding to a transaction request for a monetary contribution to alleviate the detected unsafe condition, the alert being broadcasted to a user application running on a user device associated with each of the one or more registered users.

17. The non-transitory computer-accessible medium of claim 16, further comprising instructions for evaluating one or more prioritized parameters to determine a level of interest of a registered user for each of the one or more threshold values associated with an unsafe household condition.

18. The non-transitory computer-accessible medium of claim 17, wherein the one or more prioritized parameters are specified by the registered user.

* * * * *